UNITED STATES PATENT OFFICE 2,691,604

HARDENING OF POLYVINYL ALCOHOL COATINGS ON PAPER

William J. Priest, Rochester, N. Y., assignor to Eastman Kodak Company, Rochester, N. Y., a corporation of New Jersey No Drawing. Application August 5, 1952, Serial No. 302,825

8 Claims. (Cl. 117—60)

This invention comprises a process of coating on paper of compositions containing water-soluble hydroxyl-containing polymers, and for rendering these coatings water-insoluble when they have been dried and cured.

In the past, trouble has been experienced in the processing of some photographic papers due to the fact that paper ordinarily is not adapted for the soaking operations which are used in developing, fixing and washing the photographic emulsion. Not only has the paper support portion of the photographic paper been susceptible to change, such as loss of wet strength, but also the photographic emulsion itself has been adversely affected, as evidenced by blistering, frilling and the like.

Previous attempts have been made to increase the wet strength of paper, but in many of those previous cases it has also been necessary to incorporate plasticizer in the paper due to the brittleness tendencies induced in the paper in increasing its wet strength because of either the nature of the material incorporated in the paper or the amount of the material which was necessary. In the case of many papers treated to improve their wet strength, the sensitized emulsion coated thereon has been deleteriously affected by the wet strength imparting material used.

Recently, the use of polyvinyl alcohol or resins having a large proportion of polyvinyl alcohol has been suggested for photographic purposes, such as for instance, a carrier for a light-sensitive material. For many purposes, however, polyvinyl alcohol or the polyvinyl acetates, which are water-soluble by virtue of their polyvinyl alcohol content, have not been regarded as sufficiently resistant to the effects of water or of elevated temperatures. Consequently, water resistant polyvinyl compounds have been developed containing water-soluble reaction products of formaldehyde and melamine which, when prepared under desirable conditions, cause polyvinyl coatings to harden sufficiently so that processing, ferro-typing, and the like can be carried out without detrimentally affecting either the physical or photographic properties of the product so treated. Aqueous coating compositions containing methylol melamine, polyvinyl alcohol, and low molecular weight condensation products thereof, gel when the pH is adjusted to about 4. The hardening rate also is a function of the pH, requiring a longer time to harden as the pH approaches 7. However, the viscosity increase of these compositions upon standing renders the handling of these materials rather critical and limits the coating time and total quantity of coating composition which can be handled in one batch. Therefore, even in small batches, it is necessary continually to compensate, by coating machine adjustments, for increases in viscosity of such materials.

I have found that in systems for rendering polyvinyl alcohol compositions insoluble in water at elevated temperatures by use of an acidic catalyst which come within the purview of this invention, if the catalyst is kept apart from the coating composition until after the coating containing the polyvinyl alcohol and hardening addenda has been deposited on the porous matrix, the viscosity increase is deferred until the coating mixes with the catalyst. This renders such coating materials immensely more useful and is accomplished by incorporating the acidic catalyst into or onto the matrix prior to application of the coating containing the polyvinyl alcohol plus the hardening or insolubilizing additive. On application of the latter coating some of the catalyst in the substratum diffuses into the coating composition in the period in which the latter is still fluid, and the process of hardening or insolubilization is actuated. The amount of catalyst and consequent time and degree of hardening or insolubliziation may be regulated by the amount of catalyst which is incorporatde on or in the substratum.

The invention is particularly applicable to coating absorbent surfaces such as paper and the like, but is also applicable to the coating of other surfaces of a less absorbent nature.

One object of my invention is to provide a new method of hardening a coating composition, particularly those containing polyvinyl alcohol and a hardening agent, comprising pretreating the surface to be coated with a suitable catalyst before applying the coating. Another object of my invention is to provide a coating material as referred to above which is readily maintained at substantially constant viscosity, thus eliminating the inconvenience occasioned by undesirable viscosity increases during the coating operation. A further object of my invention is to provide methods for coating water soluble polyvinyl alcohol compositions on paper or other porous surfaces, which compositions under mild conditions of drying and curing became substantially water insoluble. Another object of my invention is to provide a coating for photographic paper imparting good wet strength to the paper without brittleness or the necessity of plasticization. A further object of my invention is to provide a coating for photographic paper in which substantially no deleterious photographic effect is exerted by the coating substance upon the light-sensitive coating. These and other objects of the invention will be apparent from consideration of this specification.

A series of measurements have been conducted on the melamine-formaldehyde-polyvinyl alcohol system (also known as polyvinyl alcohol-methylol-melamine) at various pH values. These mixtures were formulated as follows:

A. METHYLOL-MELAMINE 150 parts 20% formaldehyde and 30 parts melamine were mixed and adjusted to a pH of 7. This mixture was stirred for two hours at 70–75° C., during which time the melamine dissolved, and later a small quantity of sediment separated. The clear supernatant liquid was removed by filtration at the end of the heating period.

B. POLYVINYL ALCOHOL 150 parts of aqueous polyvinyl alcohol gel, containing 17% polyvinyl alcohol, which was made by substantially complete deacetylation of a V–22 polyvinyl acetate (for the latter polymer, a solution containing 8.6 grams of polyvinyl acetate per 100 cc. of benzene has a viscosity of 22 cp.), were dissolved in 330 parts water by heating at 85° C. for thirty minutes. To this solution were added 6.5 parts sodium nitrate dissolved in 20 parts of water.

To 456.5 parts of mixture "B" were added 25 parts of mixture "A." This was divided into three equal portions which were treated as follows:

Portion 1: adjusted to pH 4 with citric acid after having added .3 part of sodium acetate.

Portion 2: adjusted to pH 5.5 with citric acid after having added .3 part of sodium acetate.

Portion 3: adjusted to pH 7 and 10 parts of a phosphate buffer of the Clark and Lubs type were added.

Portion 1 rapidly became turbid on standing at room temperature. The mixture set to a gel within two hours. Viscosity measurements were conducted on portions 2 and 3 at 25° C. with the following results:

*Table I*

| Time after mixing (hours) | Viscosity (centipoises) | |
| --- | --- | --- |
| | Portion 2 | Portion 3 |
| 1 | 38 | |
| 2.25 | 42 | |
| 2.5 | | 29 |
| 4.0 | 55 | 29 |
| 5.0 | 90 | 29 |
| 6.0 | 182 | |
| 22.0 | ∞ (gel) | 29 |

From the foregoing data it is evident that interaction in the methylol-melamine-polyvinyl alcohol system is strongly pH dependent.

The following examples illustrate the principle involved in my invention:

EXAMPLE 1

Portions of baryta-coated photographic paper, in which the pigment layer was bound by gelatine, were dip coated in solutions of citric acid ranging in concentration from 0 to 10 weight percent. These were air dried at room temperature and afterwards were dip coated in the composition (C) shown below:

*Coating composition (C).*—To 25 parts of a methylol-melamine condensate made by heating 30 parts of melamine with 150 parts 20% aqueous formaldehyde at pH 7 for two hours at 70–75° C. were added 456.5 parts of an aqueous solution containing 1.35% of sodium nitrate and 5.3% of polyvinyl alcohol, the viscosity of which was 22 centipoises/molar solution in water. Seventy-five parts of this composition were adjusted to pH of 7 and buffered at this pH with a phosphate buffer. To this were added 1.7 parts of potassium bromide dissolved in a little water and finally, with stirring, 2.1 parts of silver nitrate in water.

Following the dip coating, the papers were immediately hung in a vertical position and allowed to dry at room temperature. After drying and curing for various periods, at room temperature, samples of the papers were developed in Kodak D–72 developer (Langes "Handbook of Chemistry," fifth edition), washed in dilute acetic acid and held in running water at about 70° C. for one minute. They were then removed and rubbed for assessment of the resistance of the coating to disintegration. The following table shows the results obtained:

*Table II*

| Sample | Percent Citric Acid in Sub Coat | Curing Time at Room Temperature | Properties of Hot Water-softened Coating |
| --- | --- | --- | --- |
| | | Days | |
| A | 10 | 1 | Hard, no wash or rub off of pigment. |
| B | 5 | 1 | Hard; Pigment rubs off with abrasion. |
| C | 2½ | 1 | Partially hard; Pigment rubs off. |
| D | 0 | 1 | Pigment washes off. |
| E | 10 | 2 | Same as A above. |
| F | 5 | 2 | Do. |
| G | 2½ | 2 | Do. |
| H | 0 | 2 | Pigment washes off. |

EXAMPLE 2

Portions of baryta-coated papers were dip coated in solutions of hydrated aluminum sulfate ($Al_2(SO_4)_3 \cdot 18H_2O$), varying in concentration from 0 to 10%. These were air dried at room temperature and then coated with coating composition C shown in Example 1. Procedures for coating, drying, curing and evaluation were the same as those used in Example 1. Results of the evaluations are shown in Table III:

*Table III*

| Sample | Percent $Al_2(SO_4)_3 \cdot 18H_2O$ in sub coat | Curing Time at Room Temperature | Properties of Hot Water-softened Coating |
| --- | --- | --- | --- |
| | | Days | |
| A | 10 | 1 | Hard, but pigment rubs off with vigorous rubbing. |
| B | 5 | 1 | Pigment rubs off with moderate abrasion. |
| C | 2½ | 1 | Washes off. |
| D | 0 | 1 | Do. |
| E | 10 | 2 | Hard and resistant to abrasion. |
| F | 5 | 2 | Hard and good abrasion resistance. |
| G | 2½ | 2 | Partially hard, abraids easily. |
| H | 0 | 2 | Washes off. |

EXAMPLE 3

Portions of baryta-coated paper, were dip coated in solutions of hydrated aluminum sulfate $Al_2(SO_4)_3 \cdot 18H_2O$ varying in concentraton from 10 to 0 percent, then air dried at room temperature. One set of papers was given two dip coatings in the 10% solution. The papers so treated were dip coated in composition (D), made as follows:

154 parts of a 6.5% aqueous polyvinyl alcohol, viscosity 22 centipoises/molar solution in water
.5 part ammonium chloride in 5 parts water
4.0 parts 40% formaldehyde
3.7 parts of potassium bromide in 10 parts water After mixing there were added with stirring 5.2 parts silver nitrate in 30 parts of water. The pH was adjusted to 4.

These coatings were cured at room temperature for various periods of time. The coatings were evaluated in the same way as those in Example 1. The results of the evaluation are given in Table IV.

Table IV

| Sample | Number of Precoats of $Al_2(SO_4)_3$ | Concentration of $Al_2(SO_4)_3 \cdot 18H_2O$ in Precoat | Time of cure at room temperature | Properties of hot-water softened coating |
|---|---|---|---|---|
| | | Percent | Days | |
| A | 2 | 10 | 1 | Insoluble, moderate abrasion resistance. |
| B | 1 | 10 | 1 | Insoluble, fair abrasion resistance. |
| C | 1 | 5 | 1 | Insoluble, highly swollen, poor abrasion resistance. |
| D | 1 | 2.5 | 1 | Insoluble, but inferior to C in strength. |
| E | 1 | .8 | 1 | Washes off. |

The catalyst or reaction component may be applied in the manner described or it may be put on in conjunction with addenda such as starch or other water dispersible substances of considerable viscosity which prevent saturation of the paper or paper base stocks with the reagent and retain most of it on the surface. In cases where precoatings such as pigment binder mixtures are applied to paper before the final coating is applied, the catalyst or reaction component may be introduced as a component of the pigment binder combination applied to paper before the final coating is applied.

While this invention is intended for application in photographic practice, it may be employed to advantage in any operation in which it is desired to obtain insolubilization of hydroxyl-containing polymers under mild conditions of treatment, and where ease of control of the viscosity of the coating material is important.

The above examples describe the preferred embodiments of the invention, but other modifications are included within the scope of the invention as defined in the appended claims.

I claim:

1. A process for obtaining coatings of polyvinyl alcohol-methylol-melamine and low molecular weight condensation products thereof, comprising the steps of first coating a porous surface with citric acid and then coating with a polyvinyl alcohol-methylol-melamine mixture.

2. A method of obtaining a water insoluble coating on paper comprising coating a mixture of polyvinyl alcohol and methylol-melamine on paper to which citric acid has been applied.

3. A process for obtaining water resistant coatings of a mixture of polyvinyl alcohol and methylol-melamine on paper, comprising first coating the paper with aluminum sulfate and then with a mixture of polyvinyl alcohol and melamine-formaldehyde.

4. A process for obtaining water resistant coatings on a paper base comprising first coating the paper base with citric acid, drying the coating and then coating with a methylol-melamine-polyvinyl alcohol composition.

5. A process for obtaining water resistant coatings on a surface, comprising first coating the surface with citric acid, followed by coating with a methylol-melamine-polyvinyl alcohol composition.

6. A process for obtaining water resistant coatings on a surface, comprising coating said surface with an aqueous solution of from about 2 to about 10% citric acid, drying the coating, and then applying a coating of polyvinyl alcohol-methylol-melamine mixture having a pH of 7.

7. A process for obtaining water resistant coatings on a surface, comprising coating said surface with an aqueous solution of from 2–10% citric acid, drying the coating and then applying a coating of a composition containing methylol-melamine condensate and polyvinyl alcohol.

8. A process for obtaining coatings of polyvinyl alcohol-methylol-melamine and low molecular weight condensation products thereof, comprising the steps of first coating a porous surface with an acidic catalyst selected from the group consisting of citric acid and aluminum sulfate, and then coating with a polyvinyl alcohol-methylol-melamine mixture.

References Cited in the file of this patent

UNITED STATES PATENTS

| Number | Name | Date |
|---|---|---|
| 2,380,239 | Howald | July 10, 1945 |

OTHER REFERENCES

Elvanol, issued by E. I. du Pont de Nemours & Co., Inc. (1947), pages 34–35.